United States Patent [19]
Arold et al.

[11] Patent Number: 5,354,234
[45] Date of Patent: Oct. 11, 1994

[54] ACTUATING DEVICE FOR A MOTOR VEHICLE REGULATING FLAP

[75] Inventors: Klaus Arold; Otto Plajer, both of Sindelfingen, Fed. Rep. of Germany

[73] Assignee: Mercedes-Benz AG, Fed. Rep. of Germany

[21] Appl. No.: 70,987

[22] Filed: Jun. 4, 1993

[30] Foreign Application Priority Data

Jun. 24, 1992 [DE] Fed. Rep. of Germany ....... 4220668

[51] Int. Cl.⁵ .............................................. B60H 1/24
[52] U.S. Cl. ........................................ 454/69; 251/77; 251/228; 251/279
[58] Field of Search ...................... 251/78, 80, 77, 228, 251/279; 454/69, 143, 159, 161

[56] References Cited
U.S. PATENT DOCUMENTS

| | | | |
|---|---|---|---|
| 1,020,076 | 3/1912 | Bowser | 251/78 |
| 1,782,012 | 11/1930 | Rattigan | 251/77 X |
| 1,784,125 | 12/1930 | Wilson et al. | 251/77 X |
| 2,166,866 | 7/1939 | Hansen | 251/77 |
| 3,216,692 | 11/1965 | Walker | 251/77 |

FOREIGN PATENT DOCUMENTS

| | | |
|---|---|---|
| 2756744 | 11/1983 | Fed. Rep. of Germany . |
| 2936817 | 4/1985 | Fed. Rep. of Germany . |
| 1259627 | 1/1972 | United Kingdom . |
| 2095396 | 9/1982 | United Kingdom . |

*Primary Examiner*—Harold Joyce

[57] ABSTRACT

An actuating device for a pivotable regulating flap in a motor vehicle rests against a stop formed on an air passage opening when closing the latter. The actuating device has an actuating member remote from the regulating flap and a connecting rod for converting the actuating stroke of the actuating member into a pivoting movement of the regulating flap. In order to obtain a self-adjusting actuating device without the necessity for readjustment operations, the connecting rod is of two-part configuration, and an elastically compressible connecting member with a prestressing force greater than the actuating force during the closing operation is secured between the two rod parts. The actuating stroke of the actuating member is sized to be larger than the control stroke of the regulating flap for its transfer into a closed position.

16 Claims, 2 Drawing Sheets

ACTUATING DEVICE FOR A MOTOR VEHICLE REGULATING FLAP

BACKGROUND AND SUMMARY OF THE INVENTION

The present invention relates to an actuating device for a regulating flap in motor vehicles, such as a heater or ventilation flap, and, more particularly, to an actuating device which is configured to be movable about a pivot and, at least in a closed position thereof, rests against a stop which fixes the flap, comprising an actuating member, remote from the regulating flap, for actuation of the regulating flap, and a connecting rod operatively arranged between the regulating flap and the actuating member to convert an actuating stroke of the actuating member into a pivoting movement of the regulating flap.

A known actuating device is described, for example, in German Patent No. 935,597. To adapt the maximum actuating travel of the actuating member to the control travel required to close the regulating flap, starting from its position of maximum opening, adjusting elements are generally provided in the connecting rod.

An adjusting element of a known kind is described, for example, in DE 29 36 817 C2. It consists of two coaxial parts, screwed together, in the course of a force transmission member. One part is rested against an actuating bridge while the other part is connected via a sliding guide to a Bowden cable. By screwing one part further into the other part or screwing one part to a relatively great extent out of the other part, the length of the adjusting element can be altered and hence tolerances in the control travel of the actuating bridge compensated. Such adjusting elements require, however, additional assembly time and assembly costs. Moreover, these readjustment operations become extremely difficult and complicated if the force transmission member is concealed, as it frequently is, for example if the connecting rod is accommodated together with the regulating flap in the heater unit.

Tolerances in the control travel of the regulating flap arise only in the course of time and with relatively long use of the actuating device and hitherto regularly led to leaky regulating flaps with the necessity for readjustment in the workshop. Such leaks hitherto occurred regularly with air shut-off flaps, e.g. ventilation or heater flaps, which shut off the air passage opening in an airtight manner by means of a sealing lip. Ageing causes such sealing lips to settle and, as a result, the control travel for the regulating flap to ensure airtight closure of the regulating flap becomes gradually larger.

Windscreen wipers in motor vehicles are shown, for example, in DE 27 56 744 C2 in which resilient apparatus consisting of a first piston connected to one rod part, a guide cylinder connected to the other rod part and accommodating the piston in displaceable fashion, and a compression spring supported against the cylinder and the piston are provided in the wiper linkage. The compression spring presses the piston against a stop in the cylinder and is designed to be so strong that the resilient apparatus act as rigid connecting parts between the two rod parts during the operation of the wiper. The resilient connecting device in the known windscreen wipers serve the purpose, however, of enabling the wiper arms to be guided manually out of the well for the wiper arm with the wiper motor stationary, by pivoting in the wiping direction of the wiper arm, without damaging the wiper linkage. The manual pivoting forces exerted on the wiper arm are here taken up by the compression spring, which is compressed.

An object on which the present invention is based is to provide an actuating device for a regulating flap, in which no adjustment work is required and in which, on the contrary, tolerances occurring in the control travel of the regulating flap are compensated automatically.

The foregoing object has been achieved according to the present invention, in an actuating device for a regulating flap by providing a maximum actuating stroke of the actuating member is larger than a pivoting distance to be travelled by the regulating flap during transfer thereof from a position of maximum opening into the closed position against the stop to compensate for maximum travel tolerances. The connecting rod consists of two rod parts, one of which is coupled to the regulating flap and the other of which is coupled to the actuating member, and, the rod parts are operatively connected to one another to transmit an actuating force in a pulling and pushing direction, via an elastically compressible connecting member configured such that a required compressive force is greater than an actuating force to be transmitted over travel of the regulating flap to the closing position thereof.

In the actuating device according to the present invention, the greater size of the actuating stroke as compared with the control travel and the resilient connecting member between the rod parts of the two-part connecting rod ensure that the regulating flap is always reliably transferred into its closed position. A residual stroke of the actuating member which remains after this is taken up by compression of the elastic connecting member. As a result, even tolerances in the control travel of the regulating flap are automatically compensated.

With the actuating device according to the present invention, the elastic connecting member, which is compressed in the closed condition of the regulating flap, is, after travelling the increasing control travels, somewhat less compressed but still presses the sealing lip onto the rim of the air passage opening in a reliable manner.

The actuating device according to the present invention thus makes it possible to install the actuating device at the factory and to dispense completely with adjustment after assembly, and furthermore provides a long-term guarantee of reliable airtightness for regulating flaps used as air shut-off flaps.

In one currently preferred embodiment of the present invention, the elastically compressible connecting member is formed by a piston arranged on one rod part, a guide cylinder which is arranged on the other rod part and accommodates the piston in axially displaceable fashion, and a compression spring which is supported against the piston and against the base of the guide cylinder and brings the piston to rest against a stop on the guide cylinder. The prestressing force of the compression spring is configured to be greater than the actuating force required to close the regulating flap. As a result, the spring remains stiff over the entire control travel and is not compressed. The actuating stroke of the actuating member is thus transmitted to the regulating flap at a ratio of 1:1 over the entire control travel, and only after the regulating flap has been brought to rest against its stop is the remaining actuating stroke of the actuating member compensated by compression of the compression spring.

BRIEF DESCRIPTION OF THE DRAWINGS

These and other objects, features and advantages of the present invention will become more apparent from the following detailed description when taken in conjunction with the accompanying drawings wherein.

DETAILED DESCRIPTION OF THE DRAWINGS

Figure 1:
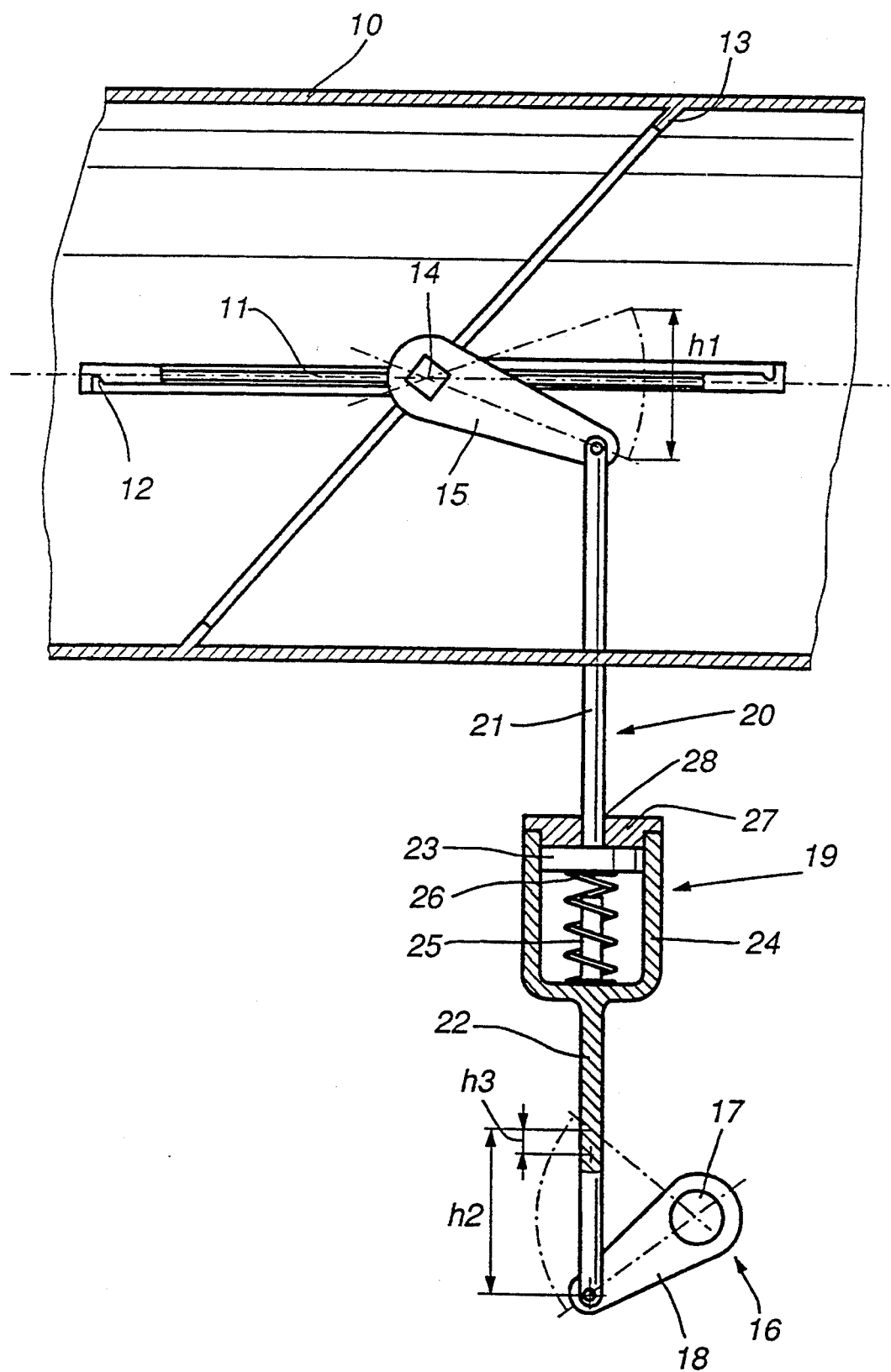
FIG. 1 is a longitudinal sectional view of an actuating device for a heater flap arranged in a heating duct of a motor vehicle in accordance with the present invention, with the heater flap opened to the maximum extent.
Figure 2:
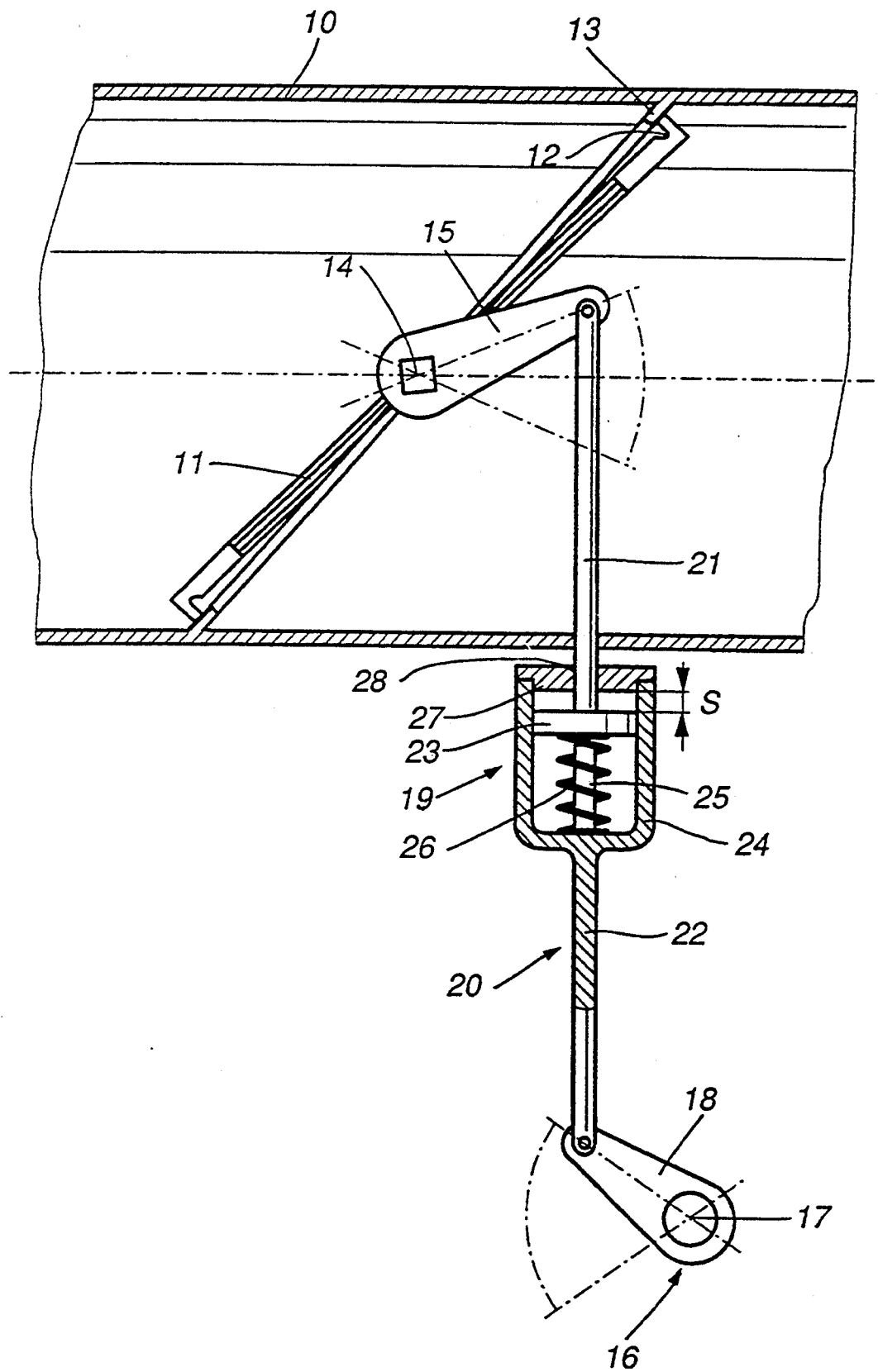
FIG. 2 is similar to FIG. 1, but with the heater flap in the closed position.

In the actuating device shown in FIGS. 1 and 2, for a heater flap 11 as an example of a regulating flap in general, the heater flap 11 is arranged in a heating duct 10 and serves to shut off or free, partially or completely, the air passage cross-section of this heating duct 10. In the closed position of the heater flap 11 shown in FIG. 2, the flap rests via a sealing lip 12 running around the rim against an all-round stop 13 fixed to the duct and shuts off the duct 10 in an airtight manner.

In the position of maximum opening of the heater flap 11 shown in FIG. 1, the heater flap 11 is in alignment with the axis of the duct and exposes the full cross-section of the heating duct 10 for the air flow. For this purpose, the heater flap 11 is mounted pivotably in the heating duct 10 by way of a pivot 14 aligned transversely to the axis of the duct. Seated in a rotationally fixed manner on the pivot 14 is a first pivoted lever 15, on which an actuating force produced by an actuating member 16 acts, thus moving the heater flap 11 into a pivoted position determined by the actuating member 16.

For simplification and clarity, only the input shaft 17 of an electric motor actuating member 16, is shown. Seated in a rotationally fixed manner on this is a second pivoted lever 18 to convert the rotary motion of the input shaft 17 into a pivoting movement. Articulated on the end of the second pivoted lever 18 which is remote from the input shaft is a connecting rod designated generally by numeral 20 which is connected in articulated manner, at the other end, to that end of the first pivoted lever 15 which is remote from the pivot. Thus, the pivoting movement of the second pivoted lever 18 can be transmitted to the first pivoted lever 15 via an elastically compressible connecting member 19.

The connecting rod 20 is of two-part configuration and consists of the two rod parts 21, 22, which are in alignment with one another. At its end facing rod part 22, the rod part 21 bears a piston 23 integral therewith, and the rod part 21 is articulated on the first pivoted lever 15, while the second rod part 22 is assigned to the second pivoted lever 18. Formed integrally with the second rod part 22 at that end of the second rod part 22 which faces the first rod part 21 is a guide cylinder 24 which accommodates the piston 23 on the first rod part 21 in axially displaceable fashion.

A guide pin 25 projects coaxially from the base of the guide cylinder 24, over which guide pin 25 is placed a compression spring 26 supported, at one end, against the annular base of the guide cylinder 24 and, at the other end, against that face of the piston 23 which faces the base of the guide cylinder 24. The guide cylinder 24 is closed by way of a cover 27. The cover 27 has a coaxial hole 28 through which the first rod part 21 passes. The cover 27 forms a stop for the purpose of limiting the displacement of the piston 23, against which the piston 23 is brought to rest under the action of the compression spring 26.

The spring force of the compression spring 26 is sized to be greater than the actuating force to be transmitted from the second pivoted lever 18 to the first pivoted lever 15 via the connecting rod 20 during the closing operation of the heater flap 11. As a result, the piston 23 remains pressed against the cover 27 during the entire closing operation of the heater flap 11; the piston 23, the guide cylinder 24 and the compression spring 26 represent the rigid connecting member 19 between the two rod parts 21, 22. This connecting member 19 is compressed resiliently only after the heater flap 11 has been brought to rest against the stop 13, with the associated increase in the compressive force acting thereon.

The actuating stroke of the actuating member 16, i.e. the rotary movement of the input shaft 17 and the corresponding pivoting movement of the second pivoted lever 18, is now fixed such that it is larger than the control travel of the heater flap 11 out of its position of maximum opening (FIG. 1) into its closed position (FIG. 2). Possible manufacturing tolerances in the production of the actuating device and an enlargement of the control travel of the heater flap 11 due to age-related reduction of the thickness of the sealing lip 12 are taken into account in this control travel.

To close the heater flap 11, starting from its open position shown in FIG. 1, the second pivoted lever 18, which is driven by the actuating member 16, performs an actuating stroke h2. This actuating stroke h2 is transmitted via the connecting rod 20 to the first pivoted lever 15, which performs a corresponding control stroke and, in the process, pivots the heater flap 11 in the counter-clockwise direction in FIG. 1. After a stroke h1, which is smaller than the actuating stroke h2, a sealing lip 12 of the heater flap 11 rests against the stop 13 and seals off the air passage cross-section of the heating duct 10 in an airtight manner. With the heater flap 11 fixed, the second pivoted lever 18 nevertheless continues to perform its residual stroke h3, leading to a compression of the compression spring 26 by the travel s (FIG. 2). The spring travel s is equal to the residual stroke h3 of the second pivoted lever 18. During the closure of the heater flap 11, the compression spring 26 is thus always pressed in by the spring travel s and thus, in addition, brings the heater flap 11 to rest with sufficient closing force against the all-round stop 13 in the housing duct 10.

Although the sealing lip 12, generally manufactured from rubber, experiences fatigue with time due to the onset of the ageing process, leading to a reduction of its thickness, and hence to an enlargement of the regulating stroke h1 of the first pivoted lever 15 before the heater flap 11 is brought to rest against the stop 13, the residual stroke h3 in the actuating stroke is correspondingly smaller and the compression spring 26 is compressed by a smaller spring travel s. As before, however, the compression spring 26 still presses the heater flap 11 against the stop 13 with the same closing force as before.

In the same way as the tolerances which arise due to ageing phenomena in the sealing lip 12, tolerances in the control travel of the heater flap 11 due to manufacture or assembly are also automatically compensated, thereby rendering superfluous adjustment of the regulating flap subsequent to assembly or at any point after it has been put into operation.

The present invention is not limited to the specific embodiment described above. It is also possible, for example, to form in some other way the resilient connecting member 11 which is formed by the piston 23, the guide cylinder 24 and the compression spring 26, is situated between the two rod parts 21 and 22 of the connecting rod 20 and transmits the actuating forces as a rigid element both in the pulling and the pushing direction and only makes its spring property felt when the closed position of the heater flap 11 is reached. For instance, a correspondingly pre-stressed elastomer body can be provided. Moreover, the actuating member 26 can also be manually operable.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An actuating device for a motor vehicle regulating flap including a heater and a ventilation flap, selectively to expose and close an air passage cross-section, the flap being movable about a pivot and, at least in a closed position thereof, rests against a stop which fixes the flap, comprising an actuating member, spaced from the regulating flap, for actuation of the regulating flap, and a connecting rod operatively arranged between the regulating flap and the actuating member to convert an actuating stroke of the actuating member into a pivoting movement of the regulating flap, wherein a maximum actuating stroke of the actuating member is larger than a pivoting distance to be travelled by the regulating flap during transfer thereof from a position of maximum opening into the closed position against the stop to compensate for maximum travel tolerances, the connecting rod consisting of two rod parts, one of which is coupled to the regulating flap and the other of which is coupled to the actuating member, and the rod parts being operatively connected to one another to transmit an actuating force in a pulling and pushing direction, via an elastically compressible connecting member configured, such that a required compressive force is greater than an actuating force to be transmitted over travel of the regulating flap to the closing position thereof.

2. The device according to claim 1, wherein the elastically compressible connecting member comprises a piston arranged on one rod part, a guide cylinder arranged on the other rod part and accommodating a piston in axially displaceable manner, and a compression spring which is supported against the piston and against the guide cylinder so as to bring the piston to rest against a stop on the guide cylinder, and a spring force of the compression spring sized to be greater than the actuating force required to close the regulating flap.

3. The device according to claim 2, wherein the piston is connected integrally to the one rod part, and the guide cylinder is connected integrally to the other rod part.

4. The device according to claim 2, wherein the guide cylinder is closed off by a cover which has a central hole for passage of the rod part connected to the piston, and the cover constitutes the stop for the piston.

5. The device according to claim 4, wherein the piston is connected integrally to the one rod part, and the guide cylinder is connected integrally to the other rod part.

6. The device according to claim 1, wherein the regulating flap is rigidly connected to a pivoted lever arranged to be pivoted about the pivot, and the coupling of the one rod part assigned to the regulating flap is effected at that end of the pivoted lever remote from the pivot.

7. The device according to claim 6, wherein the elastically compressible connecting member comprises a piston arranged on one rod part, a guide cylinder arranged on the other rod part and accommodating a piston in axially displaceable manner, and a compression spring which is supported against the piston and against the guide cylinder so as to bring the piston to rest against a stop on the guide cylinder, and a spring force of the compression spring sized to be greater than the actuating force required to close the regulating flap.

8. The device according to claim 7, wherein the piston is connected integrally to the one rod part, and the guide cylinder is connected integrally to the other rod part.

9. The device according to claim 2, wherein the guide cylinder is closed off by a cover which has a central hole for passage of the rod part connected to the piston, and the cover constitutes the stop for the piston.

10. The device according to claim 1, wherein the actuating member is rigidly connected, via a rotatably mounted pivot, to a second pivoted lever, and the coupling of the other rod part operatively associated with the actuating member is effected at that end of the second pivoted lever remote from the pivot.

11. The device according to claim 1, wherein the elastically compressible connecting member comprises a piston arranged on one rod part, a guide cylinder arranged on the other rod part and accommodating a piston in axially displaceable manner, and a compression spring which is supported against the piston and against the guide cylinder so as to bring the piston to rest against a stop on the guide cylinder, and a spring force of the compression spring sized to be greater than the actuating force required to close the regulating flap.

12. The device according to claim 11, wherein the piston is connected integrally to the one rod part, and the guide cylinder is connected integrally to the other rod part.

13. The device according to claim 12, wherein the guide cylinder is closed off by a cover which has a central hole for passage of the rod part connected to the piston, and the cover constitutes the stop for the piston.

14. The device according to claim 13, wherein the regulating flap is rigidly connected to a pivoted lever arranged to be pivoted about the pivot, and the coupling of the one rod part assigned to the regulating flap is effected at that end of the pivoted lever remote from the pivot.

15. The device according to claim 1, wherein the regulating flap has a sealing lip which, in a closed position of the regulating flap, rests on a region of a wall which surrounds an air passage cross-section and forms the stop so as to seal the air passage cross-section.

16. A method of actuating a motor vehicle regulating flap selectively to expose and close an air-passage cross-section, comprising the steps of moving a remote actuator through a maximum actuating stroke;

moving the regulating flap about a pivot through a pivoting distance smaller than a maximum actuating stroke for the remote actuator during transfer of the regulating flap from a maximum opening position to a fully closed position against a stop so as to sealingly rest the regulating flap against the stop associated with the air-passage cross-section, and providing a required compressive force between the regulating flap and the remote actuator which is greater than the actuating force to be transmitted over closing travel of the regulating flap.

* * * * *